United States Patent [19]

Montagne et al.

[11] Patent Number: 5,053,056
[45] Date of Patent: Oct. 1, 1991

[54] HYDROXYIMIDAZOLINES AND POLYAMINE FUEL ADDITIVE COMPOSITIONS

[75] Inventors: Xavier Montagne, Paris; Rémi Touet, Saint Egreve; Philippe Mullard, Saint Pierre de Chandieu; Daniéle Eber, Lyons, all of France

[73] Assignees: Institut Francais du Petrole, Rueil-Malmaison; Elf France, Courbevoie, both of France

[21] Appl. No.: 375,317

[22] Filed: Jun. 29, 1989

[30] Foreign Application Priority Data

Jun. 29, 1988 [FR] France ................................. 88 08899
Apr. 28, 1989 [FR] France ................................. 89 05859

[51] Int. Cl.$^5$ .............................................. C10L 1/22
[52] U.S. Cl. ........................................ 44/330; 44/331; 44/386; 44/447; 44/451; 548/352
[58] Field of Search ................ 44/63, 77, 447, 451, 44/330, 331, 386, 342, 347; 548/341, 546, 547, 548, 352

[56] References Cited

U.S. PATENT DOCUMENTS

| | | | |
|---|---|---|---|
| 3,172,892 | 3/1965 | LeSuer et al. | 252/51.5 A |
| 3,201,411 | 8/1965 | Freedman | 44/63 |
| 3,219,666 | 11/1965 | Norman et al. | 252/51.5 R |
| 3,415,750 | 12/1968 | Angenberger | 44/63 |
| 3,647,694 | 3/1972 | Swanson et al. | 44/63 |
| 3,927,994 | 12/1975 | Romans | 44/63 |
| 4,048,188 | 9/1977 | Baker et al. | 548/341 |
| 4,511,368 | 4/1985 | Knapp | 44/63 |

FOREIGN PATENT DOCUMENTS 0074724 3/1983 European Pat. Off. ................ 44/63

*Primary Examiner*—Margaret B. Medley
*Attorney, Agent, or Firm*—Millen, White & Zelano

[57] ABSTRACT

Disclosed is a composition resulting, in a first stage, from the reaction of at least one alkenyl or polyalkenyl-succinic acid or anhydride on at least one 1-(2-hydroxyethyl)-imidazoline substituted in the 2-position by a linear or branched alkyl or alkenyl radical, with 1 to 25 atoms of carbon in an imidazoline to succinic derivative molar ratio of 0.1:1 to 0.9:1 with the removal of at least 0.15 mole of water per mole of imidazoline, and then, in a second stage, from the reaction of the product obtained in the first stage on at least one polyamine in an amount representing at least 0.1 mole per mole of the succinic derivative utilized in the first stage.

Also disclosed are methods for the utilization of these compositions as multifunction additives in engine fuels having as a base hydrocarbons or a mixture of hydrocarbons and at least one oxygen compound selected from the group constituted by alcohols and ethers.

22 Claims, No Drawings

HYDROXYIMIDAZOLINES AND POLYAMINE FUEL ADDITIVE COMPOSITIONS

BACKGROUND OF THE INVENTION

The present invention relates to compositions which can notably be utilized as multifunction additives for engine fuels and which are obtained by the reaction of at least one succinic acid or anhydride with successively at least one hydroxyimidazoline and at least one polyamine.

The use of conventional fuels very often leads to the fouling of the various engine parts. Due to the incomplete vaporization and combustion of the fuel in the inlet system and/or in the combustion chamber and to the presence of lubricant traces.

In the inlet system, the accumulation of these deposits can thus occur at the level of the injectors, the carburetor and the inlet valves.

Such an accumulation has harmful consequences on the level of driving pleasure, with the appearance of an unsteady idling and misfires in spark ignition engines, as well as on the level of optimum running of the engine through the modification of the fuel-air ratio owing to the adsorption-desorption phenomena of the fuel on the formed deposits.

In order to remedy this fouling, it is possible to carry out a periodic cleaning of the affected parts, especially the valves, which is particularly costly.

The accumulation of deposits in engines and particularly on inlet valves can also be reduced by using fuels which contain certain additives, for example, detergent-type additives that are possibly combined with, for example, anticorrosive or antideposition additives for combustion chambers.

Additives, which are well-known in trade, for example, those of the polyisobutene-amine type, are usually associated with a mineral or a synthetic oil and may lead to an increasing fouling of the combustion chambers and thus to an increase in the octane requirement of the engine, with a higher sensitivity to knock phenomena.

Among the numerous additives described in prior art, one can cite the products of the condensation of polyalkenylsuccinic anhydrides and polyamines, such as, for example, tetraethylenepentamine, which are particularly described in U.S. Pat. No. 3,172,892. These additives show good results as far as anticorrosive properties are concerned, but they are not efficient as valve detergents.

One can also cite the products of the condensation of polyalkenylsuccinic anhydrides and hydroxyimidazolines, and particularly 1-(2-hydroxyethyl) imidazolines substituted in position 2 by an alkyl or an alkenyl group, such as those which are described in EP-A-74,724. The products described in this application are good additives for engine fuels and their anticorrosive action is considerable, but they are not very efficient at the level of the carburetor detergency.

SUMMARY OF THE INVENTION

Surprisingly, compositions such as those described herein have now been discovered which can be notably utilized as multifunction additives for engine fuels, especially for the fuels used in spark ignition engines.

The compositions of the present invention have excellent detergency properties at the level of the inlet valves and the carburetor, as well as very good anticorrosive properties.

These compositions, which are used as multifunction additives in engine fuels, and more particularly in fuels utilized for spark ignition engines, inhibit or strongly reduce the forming of deposits on the inlet valves, as well as the fouling of carburetors or injectors: besides, they highly reduce the corrosion of various mechanical parts contacted by the fuel.

The object of the present invention is a composition which can notably be utilized as a multifunction additive for engine fuels and which results, from the reaction in a first stage, of at least one succinic derivative selected from the group constituted by the alkenyl acids and anhydrides and the polyalkenylsuccinic acids and anhydrides, with at least one 1-(2-hydroxyethylimidazoline substituted in the 2-position by a linear or branched alkyl or alkenyl radical, with 1 to 25 carbon atoms, the imidazoline to succinic derivative molar ratio ranging from 0.1:1 to 0.9:1, preferably from 0.2:1 to 0.8:1 and most often from 0.3:1 to 0.7:1, said stage being carried out under such conditions that at least 0.15 mole of water per mole of utilized imidazoline is formed and eliminated; and in a second stage from the reaction of the product obtained in the first stage with at least one polyamine corresponding to one of the following general formulas:

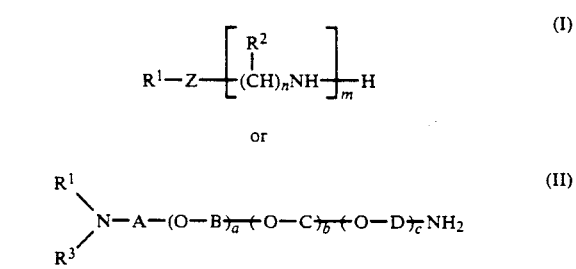

where $R^1$ represents an atom of hydrogen or a hydrocarbon group with 1 to 60 atoms of carbon, Z is selected among the —O— and —NR$^3$ — groups wherein $R^3$ represents an atom of hydrogen or a hydrocarbon group with 1 to 60 atoms of carbon, $R^1$ and $R^3$ can form together with the atom of nitrogen to which they are linked a heterocyclic compound, each $R^2$ independently represents an atom of hydrogen or a hydrocarbon group with 1 to 4 atoms of carbon, n is an integral number ranging from 2 to 6. m is an integral number from 1 to 10 when Z is —NR$^3$ — and an integral number from 2 to 10 when Z is —O—, A, B, C and D, identical or different, represent each a divalent hydrocarbon group with 2 to 6 atoms of carbon, a is an integral number ranging from 1 to 120 (preferably from 1 to 60), b and c, identical or different, are each zero or an integral number from 1 to 100 (preferably from 1 to 50) and the sum a+b+c is an integral number from 1 to 120 (preferably from 1 to 60), the amount of polyamine which is reacted being at least 0.1 mole per mole of succinic derivative introduced during the first stage. The total amount of substituted imidazoline and of polyamine preferably ranges from 0.8 to 1.2 mole per mole of succinic derivative.

The succinic acid or anhydride used within the scope of the present invention usually has an average molecular mass ranging from about 200 to 3,000, preferably from 500 to 2,000 and most often from 700 to 1,500. These succinic derivatives are widely describe in prior art; they are, for example, obtained through the reaction of at least one alpha olefin or a chlorinated hydrocarbon with maleic acid or anhydride. The alpha olefin or the chlorinated hydrocarbon utilized in this synthesis can be linear or branched and usually has 10 to 150 atoms of carbon, preferably 15 to 80 atoms of carbon and most often 20 to 75 atoms of carbon per molecule. This olefin can also be an oligomer, for example, a dimer, a trimer or a tetramer, or a polymer of a shorter chain-olefin, with, for example, 2 to 60 atoms of carbon, such as ethylene, propylene, 1-butene-n, isobutene, 1-hexene-n, 1-octene-n, 2-methyl-1-heptene or 2-methyl-5-propyl-1hexene. It is possible to use olefin mixtures or chlorinated hydrocarbon mixtures.

As an example of succinic anhydrides, one can cite n-octadekenylsuccinic anhydride, dodecenylsuccinic anhydride and polyisobutenylsuccinic anhydrides, often called PIBSA, with an average molecular mass identical to that defined above. The 1-(2-hydroxyethyl-)-imidazolines that are substituted in the 2-position by an alkyl or alkenyl radical with 1 to 25 atoms of carbon are usually commercial compounds or they can be synthesized, for example, by the reaction of at least one organic acid with N-(2-hydroxyethyl)-ethylenediamine. The reaction starts with a first amidation stage, followed by a cyclization. The organic acids that are utilized usually have 2 to 26 atoms of carbon; they preferably are monocarboxylic aliphatic acids.

As an example, one can cite acetic acid, propanoic acid, butanoic acid, caproic acid, capric acid, lauric acid, myristic acid, palmitic acid, stearic acid, behenic acid, cerotic acid and the following unsaturated fatty acids:

| | |
|---|---|
| $CH_3-CH_2-CH=CH-(CH_2)_7COOH$ | dodecylenic acid |
| $CH_3-(CH_2-)_5CH=CH-(CH2-)_7COOH$ | palmitoleic acid |
| $CH_3-(CH_2-)_7CH=CH-(CH_2-)_7COOH$ | oleic acid |
| $CH_3-(CH_2-)_5CHOH-CH_2-CH=CH-(CH_2-)_7COOH$ | ricinoleic acid |
| $CH_3-(CH_2-)_{10}CH=CH-(CH_2-)_4COOH$ | petroselenic acid |
| $CH_3-(CH_2-)_5CH=CH-(CH_2-)_9COOH$ | vaccenic acid |
| $CH_3-(CH_2-)_4CH=CH-CH_2-CH=CH-(CH_2-)_7COOH$ | linoleic acid |
| $CH_3-(CH_2-)_9CH=CH-CH-(CH_2-)_7COOH$ | gadoleic acid |
| $CH_3-(CH_2-)_9CH=CH-(CH_2-)_9COOH$ | ketoleic acid |
| $CH_3-(CH_2-)_7CH=CH-(CH_2-)_{11}COOH$ | erucic acid |
| $CH_3-(CH_2-)_7CH=CH-(CH_2-)_{13}COOH$ | salachoeic acid |

One will, for example, use 1-(2-hydroxyethyl)-2-heptadecenyl imidazoline, prepared, for example, from oleic acid and N-(2-hydroxyethyl)-ethylenediamine. This preparation is, for example, described in U.S. Pat. No. 2,987,515.

One can also cite the example of 1-(2-hydroxyethyl)-2-methylimidazoline prepared, for example, from acetic acid and N-(2-hydroxyethyl-)ethylenediamine.

1-(2-hydroxyethyl)-2 heptadecenylimidazoline is marketed by the CIBA-GEIGY company under the name "Amine-O" and by the PROTEX company under the name "Imidazoline-O".

DETAILED DESCRIPTION OF THE INVENTION

The first stage of preparation of the composition according to the invention is usually carried out by progressively adding the imidazoline derivative to a solution of the succinic derivative in an organic solvent, at an ordinary temperature, and then by heating to a temperature usually ranging from 65° to 250° C. and preferably from 80° to 200° C.

The organic solvent that is used in this preparation has a boiling point ranging from 65° to 250° C. and is usually chosen in order to be able to allow the removal of the water formed during the condensation of the imidazoline on the succinic derivative, preferably in the form of a water-organic solvent azeotrope. One usually utilizes an organic solvent such as, for example, benzene, toluene, xylenes, ethylbenzene or a hydrocarbon cut such as, for example, the SOLVESSO 150 (190°–209° C.) commercial cut containing 99% by weight of aromatic compounds. It is possible to use mixtures of solvents, for example, a mixture of xylenes. The heating time after the end of the imidazoline addition usually ranges from 0.5 to 7 hours, preferably from 1 to 5 hours. This first stage will be preferably performed at the chosen temperature until the end of the removal of the water formed during the reaction.

The amount of water removed during this first stage usually ranges from about 0.15 to 0.6 mole and most often from about 0.2 to 0.5 mole per mole of imidazoline used in the reaction. Possibly after cooling, one adds to the product or mixture obtained at the end of this first stage, preferably in a progressive way, at least one polyamine, preferably diluted in an organic solvent, then one usually heats at a temperature ranging from 65° to 250° C. and preferably from 80° to 200° C. The solvent which is utilized in this second stage is preferably the same as in the first stage and the temperature is also the same during both stages. The reactions are usually carried out at a temperature corresponding to the reflux temperature. The heating time during this second stage usually ranges from 0.1 to 7 hours and preferably from 0.2 to 5 hours. The amount of polyamine used is at least 0.1 mole per mole of succinic anhydride introduced during the first stage and it is preferably such that the total amount of substituted imidazoline and of polyamine utilized in this preparation ranges from 0.8 to 1.2 mole, preferably from 0.9 to 1.1 mole per mole of succinic derivative. The substituted imidazoline to polyamine molar ratio preferably ranges from 1:1 to 7:1 and most preferably from 1:1 to 3:1.

The amount of water removed during this second stage is usually such that the total amount of water removed during the two successive reactions ranges from 0.2 to 0.7 mole per mole of succinic derivative.

The polyamines of formula (I) are preferably those in which $R^1$ is an atom of hydrogen or a hydrocarbon group with 1 to 30 atoms of carbon, Z is preferably a $-NR^3-$ group where $R^3$ preferably represents an atom of hydrogen or a hydrocarbon group with 1 to 30 atoms of carbon, each $R^2$ independently represents preferably an atom of hydrogen or a methyl group, n is an integral number ranging from 2 to 4 and when Z is a $-NR^3-$ group, m is preferably an integral number from 1 to 5.

Among the compounds of formula (I) above, one advantageously utilizes those in which Z is $-NR^3-$, $R^1$, $R^2$ and $R^3$ each represents an atom of hydrogen, n is 2 and m is an integral number ranging from 1 to 5 or those in which $R^1$ represents a hydrocarbon group with preferably 5 to 24 atoms of carbon, Z represents a $-NR^3-$ group in which $R^3$ is an atom of hydrogen, $R^2$ represents an atom of hydrogen, n is an integral number from 2 to 4, preferably 3, and m is an integral number from 1 to 5, preferably 1.

The $R^1$ and $R^3$ hydrocarbon groups are usually linear or branched alkyl or alkenyl, aryl, arylalkyl (aralkyl), alkylaryl(alkaryl) or cycloaliphatic groups. The $R^1$ and $R^3$ groups are preferably alkyl or alkenyl groups, linear or branched. The $R^2$ hydrocarbon group is usually an alkyl group, preferably linear, and, for example, methyl, ethyl, n-propyl or n-butyl.

As specific compounds, one can cite: ethylenediamine, propylenediamine, triethylenetetramine, tripropylenetetramine, tetraethylenepentamine, trimethylenediamine, hexamethylenediamine, di(trimethylene)triamine, the N-alkyl diamino-1,3-propane, for example, N-dodecyldiamino-1,3-propane, N-tetradecyldiamino-1,3-propane, N-hexadecyldiamino-1,3propane, N-octadecyldiamino-1,3-propane, N-eicosyldiamino-1,3-propane and N-docosyldiamino-1,3propane; one can also cite the N-alkyldipropylene triamines, for example, N-hexadecyldipropylene triamine, N-octadecyldipropylene triamine, N-eicosyldipropylene triamine and N-docosyldipropylene triamine; one can also cite the N-alkenyldiamino-1,3-propane and the N-alkenyldipropylene triamines, for example, N-octadecenyldiamino-1,3-propane, N-hexadecenyldiamino-1,3-propane, N-dodecylenyldiamino-1,3-propane, N-octadecadienyldiamino-1,3-propane and N-docosenyldiamino-13-propane. One can cite as an example of disubstituted N,N-diamines; N,N-diethyldiamino-1,2-ethane, N,N-diisopropyl diamino-1,2-ethane, N,N-dibutyl diamino-1,2ethane, N,N-diethyl-diamino-1,4-butane, N,N-dimethyl-diamino-1,3-propane, N,N-dioctyldiamino-1,3-propane, N,N-didecyl-diamino-1,3-propane, N,N-didodecyl-diamino-1,3-propane, N,N-ditetradecyl-diamino-1,3-propane, N,N-dihexadecyl-diamino-1,3-propane, N,N-dioctadecyl-diamino-1,3-propane, N,N-didodecyldipropylene-triamine, N,N-ditetradecyldipropylene-triamine, N,N-dihexadecyldipropylene-triamine, N,N-dioctadecyldipropylene triamine, N-methyl, N-butyl-diamino-1,2-ethane, N-methyl, N-octyl-diamino-1,2ethane, N-ethyl, N-octyl-diamino-1,2-ethane, N-methyl, N-decyl-diamino-1,2-ethane, N-methyl, N-dodecyl-diamino-1,3-propane, N-methyl, N-hexadecyl-diamino-1,3-propane and N-ethyl, N-octadecyl-diamino-1,3-propane.

As an example of etheramines, one can cite N-(octyloxy-3-propyl)diamino-1,3-propane, N-(decyloxy-3-propyl)diamino-1,3-propane, N-(trimethyl-2,4,6-decyl)oxy-3-propyl-diamino-1,3-propane.

It is, of course, possible to use as a polyamine compound one or several compounds of formula (I) and/or (II).

As specific examples of the mixtures of compounds corresponding to formula (I), one can cite the fatty diamine cuts of the formula $R^1-NH-(CH_2-)_3NH_2$ whose $R^1$ groups are aliphatic hydrocarbon radicals with $C_8$, $C_{10}$, $C_{12}$, $C_{14}$, $C_{16}$, $C_{18}$, $C_{20}$ and $C_{22}$, in the approximate molar proportions indicated hereinafter.

TABLE I

| Cut | alkyl chains | | | | | | | | |
|---|---|---|---|---|---|---|---|---|---|
| | $C_8$ | $C_{10}$ | $C_{12}$ | $C_{14}$ | $C_{16}$ | $C_{18}$ | $C_{18-1}$* | $C_{20}$ | $C_{22}$ |
| A | 0 | 0 | 0 | 1% | 28% | 71% | 0 | 0 | 0 |
| B | 0 | 0 | 0 | 1% | 5% | 42% | 0 | 12% | 40% |
| C | 3% | 6% | 56% | 18% | 10% | 2% | 5% | 0 | 0 |
| D | 0 | 0 | 0 | 0 | 16% | 4.9% | 79.1% | 0 | 0 |
| E | 0 | 0 | 0 | 2.3% | 31.8% | 24.2% | 39% | 2.7% | 0 |

*$C_{18-1}$ chain with an ethylenic unsaturation.

The polyamines of formula (II) are preferably those where $R^1$ and $R^3$ each represents an atom of hydrogen; A,B, C and D, identical or different, each represents an alkylidene group with 2 to 4 atoms of carbon, for example, ethylidene, propylidene, isopropylidene, butylidene, or isobutylidene; a is an integral number from 1 to 60 and b and c are zero or a is an integral number from 1 to 59; c is zero or an integral number so that the sum a+c ranges from 1 to 59 and b is an integral number from 1 to 50, with in each case the sum a+b+c equal to an integral number from 1 to 60.

As specific compounds of formula (II), one can cite those corresponding to the following formulas:

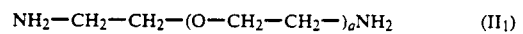

$$NH_2-CH_2-CH_2-(O-CH_2-CH_2-)_aNH_2 \quad (II_1)$$

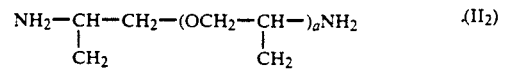

where a is 2, 3, 5, 6 or about 33

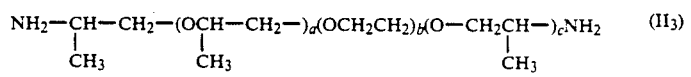

where b is equal to about 8, 9, 15, 16 or 40 and a+b+c is about 2 or 3.

These products are particularly marketed by the TEXACO Chemical company under the name of Jeffamine EDR 148 for the product of formula $(II_1)$ where a=2, Jeffamine D-230 for a product of formula $(II_2)$ with an average molecular mass of 230, Jeffamine D-400 for a product of formula $(II_2)$ with an average molecular mass of 400, Jeffamine D-2000 for a product of formula $(II_2)$ with an average molecular mass of 2,000, Jeffamine ED-600 for a product of formula $(II_3)$ with an average molecular mass of 600, Jeffamine ED-900 for a product of formula $(II_3)$ with an average molecular mass of 900 and Jeffamine ED2001 for a product of formula $(II_3)$ with an average molecular mass of 2,000.

The compositions of the present invention can be used in the form of a solution in the reaction medium or the latter can be evaporated and optionally replaced by another solvent or mixture of solvents or by a diluent.

The compositions of the present invention are mainly utilized as multifunction additives for an engine fuel, for example, a fuel having as a base hydrocarbons or a mixture of hydrocarbons and at least one oxygen compound selected from the group constituted by alcohols and ethers, or a non-hydrocarbon fuel such as, for example, an alcohol or a mixture of alcohols.

The compositions of the present invention are particularly well adapted for use as additives for the fuels utilized in spark ignition engines.

As an example of engine fuels, one can cite gasolines such as, for example, those defined by the D-439 ASTM standard, and gas-oils or diesel fuels such as, for example, those defined by the D-975 ASTM standard. these fuels may also contain additives other than the compositions of the present invention, for example, antiknock additives such as lead compounds (for example, tetraethyl lead), methyl-tertiobutylether, methyltertioamylether or a mixture of methanol and tertiobutyl alcohol; antifreezing additives; and octane requirement reducers.

The compositions of the present invention are used in an amount sufficient in order to highly decrease the deposits on the various parts of the engine, particularly at the level of the inlet valves and the carburetor. One usually utilizes amounts ranging from 10 to 1,000 ppm by weight of composition (active material) in relation to the weight of the engine fuel, preferably from 50 to 700 ppm and most often from 100 to 500 ppm.

In the present invention, one also describes formulations of fuel additives which allow obtaining improved properties in comparison to those obtained with the previous compositions. The following formulations show particularly valve detergency properties that are higher than those of the previous compositions, as it will be demonstrated by means of a particularly severe testing procedure on a M102E Mercedes engine bench.

The formulations of additives, notably for fuels, comprise at least one constituent (A) and at least one constituent (B), said constituent (A) consisting of at least one polyglycol soluble in said fuel, with an average molecular mass ranging from 480 to 2,100 and of general formula (I):

$$HO-R-(-O-R-)_x-O-R-OH \quad (1)$$

where each R group independently represents a hydrocarbon group with 2 yo 6 atoms of carbon and x represents the average degree of polymerization; and said constituent (B) consisting of at least one composition such as those described above.

In the formulations, constituent (A) is preferably a polyglycol of general formula (I) mentioned above, in which each R group independently represents a linear or branched alkylene group with 2 to 4 atoms of carbon and most often an ethylene or propylene group. Among the particularly preferred polyglycols of general formula (I), one can cite those in which each R group represents a propylene group of formula:

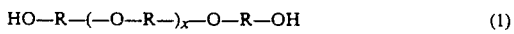

Constituent (A) is preferably a polyglycol with an average molecular mass of 600 to 1,800 and most often of 650 to 1,250. The polydispersivity number of the polyglycol used as constituent (A) in the formulations according to the present invention usually ranges from about 1 to 1.25 and most often from about 1 to 1.15.

The improved formulations of additives are mainly utilized as multifunction additives for fuels, for example, for fuels which have as a base hydrocarbons or a mixture of hydrocarbons and at least one oxygen compound usually selected from the group constituted by alcohols and ethers, or non-hydrocarbon fuels such as, for example, alcohols or alcohol mixtures. The formulations are particularly well adapted for being used as additives for fuels utilized in spark ignition engines.

As an example of fuels, one can cite gasolines such as, for example, those defined by the D-439 ASTM standard, gas-oils or Diesel fuels such as, for example, those defined by the D-975 ASTM standard. These fuels may also contain additives other than the formulations of the present invention, for example, antiknock additives such as lead compounds (for example, tetraethyl lead), methyltertiobutylether, methyltertioamylether, or a mixture of methanol and tertiobutyl alcohol; antifreezing additives; and octane requirement reducers.

The formulations are used in an amount sufficient for obtaining a considerable decrease of the deposits on the various parts of the engine, for example, at the level of the carburetor and more particularly at the level of the inlet valves. One usually utilizes amounts representing 20 to 3,000 ppm by weight of formulation (active material) in relation to the weight of the fuel, preferably 80 to 2,000 ppm and most often 160 to 1,500 ppm.

In the improved formulations, the amount by weight of constituent (A) usually ranges from about 10 to about 2,000 ppm, preferably from about 30 to 1,300 ppm and most often from about 60 to 1,000 ppm, and the amount by weight of constituent (B) usually ranges from about 10 to 1,000 ppm, preferably from about 50 to 700 ppm and most often from about 100 to 500 ppm. In these formulations, the amount of each constituent (A) and (B) is usually such that the A/B ratio of these amounts ranges from about 0.05:1 to about 20:1 and preferably from about 0.1:1 to about 10:1.

The following examples illustrate the invention without limiting the scope thereof. Examples 9 to 11 are given by way of comparison, as well as 16, 17, 21, 22, 23, 24, 26, 27.

EXAMPLE 1

1.018 g of polyisobutenylsuccinic anhydride (PIBSA) resulting from the condensation of polyisobutene (polyisobutene with an average molecular mass of 920) on maleic anhydride (the quantitative analysis of the anhydride functions of this product shows a 0.7 anhydride function per theoretical mole of PIBSA) and 1.018 g of xylene are charged into a 2 liter-reactor equipped with a mechanical stirring device, a Dean-Stark apparatus and a temperature regulation system.

148 g (0.423 mole) of 1-(2-hydroxyethyl)-2-heptadecenyl imidazoline diluted in 148 g of xylene is then added. The addition is performed in 30 minutes, under a fast increase of the temperature of the reaction mixture by about 5° C.

The mixture is then brought to refluxing for 3 hours while the reaction water is removed by azeotropic distillation. The amount of collected water is 2.3 ml. The advance of the reaction can also be followed by infrared spectrometry at the level of the absorption band of the imine function at 1,660 cm$^{-1}$ which progressively disappears during the reaction.

The temperature of the reactor is cooled to and maintained at 50° C. 56 g (0.297 mole) of tetraethylenepentamine diluted in 49 g of xylene is progressively added (drop by drop). At the end of this addition, the mixture is refluxed for an additional 15 minutes. Another water removal occurs. The total amount of water collected during these two reaction stages is 7.2 ml. The infrared spectrum shows two absorption bands (1.710 cm$^{-1}$ and 1.770 cm$^{-1}$) which are characteristic of the succinimide function, with a shoulder (1.740 cm$^{-1}$) characteristic of the ester function.

A solution is thus obtained of 50% by weight of active material in the xylene of a composition according to the invention.

The elementary ultimate analysis of the composition shows a nitrogen content of 2.55% by weight.

EXAMPLE 2

As in Example 1, a composition is prepared according to the invention but tetraethylenepentamine is replaced with diethylenetriamine. 102 g (0.1 mol) of PIBSA with a 0.68 anhydride function per 1,000 g of product and 102 g of xylene are charged into the reactor, 14 g (0.04 mole) of 1-(2-hydroxyethyl)-2-heptadecenyl imidazoline diluted in 14 q of xylene is then added progressively (drop by drop). The mixture is then refluxed for 3 hours, while 0.2 ml of water is removed by azeotropic distillation. This water removal essentially occurs during the first 170 minutes of the reaction. After cooling to 50° C., 2.9 g (0.028 mole) of diethylenetriamine diluted in 2 g of xylene is progressively added, followed by refluxing for 3 hours. The total amount of water removed during the two stages is 0.65 ml. A solution is thus obtained by weight of active material in the xylene of a composition according to the invention.

EXAMPLE 3

The procedure described in Example 2 is repeated, but diethylene triamine is replaced by a tallow diamine such as that marketed by the CECA company under the trademark Dinoram S and corresponding to cut E, the characteristics of which are listed in Table I above. 10.1 g (0.028 mole) of Dinoram S are added during the second stage. The total amount of water removed is 0.85 ml. A solution is thus obtained of 50% by weight of active material in the xylene of a composition according to the invention.

EXAMPLE 4

The procedure described in Example 2 is repeated, but diethylene triamine is replaced by 1.68 g (0.028 mole) of ethylenediamine and toluene is used as a reaction solvent instead of xylene.

A solution is obtained of 50% by weight of active material in the toluene of a composition according to the invention.

EXAMPLE 5

The procedure described in Example 2 is repeated but diethylenetriamine is replaced by the polyoxyalkyleneamine marketed by the TEXACO company under the name Jeffamine D-230, with an average molecular mass of 230. 6.44 g 0.028 mole) of Jeffamine D-230 are added during the second stage. The total amount of removed water is 0.7 ml. A solution is thus obtained of 50% by weight of active material in the xylene of a composition according to the invention.

EXAMPLE 6

Example 5 is repeated by using 11.2 g (0.028 mole) of Jeffamine D-400 sold by the TEXACO company, with an average molecular mass of 400. The total amount of removed water is 0.4 ml. A solution is thus obtained of 50% by weight of active material in the xylene of a composition according to the invention.

EXAMPLE 7

15.6 g (0.15 mole) of N-hydroxyethylethylenediamine diluted in 15.6 g of toluene is introduced into a 2-liter reactor equipped with a mechanical stirring device, a Dean-Stark apparatus and a temperature regulation system to which 9 g (0.15 mole) of glacial acetic acid diluted in 9 g of toluene is progressively (drop by drop) added. The mixture is then refluxed for 16 hours, during which 4.8 ml of water is removed by azeotropic distillation. The reaction product is isolated after the vacuum evaporation of the toluene. A pale yellow oily product is thus obtained, identifiedusing conventional methods of analysis as 1-(2-hydroxyethyl)-2-methyl imidazoline.

The infrared spectrum shows an imine band at 1,660 cm$^{-1}$ and, by means of nuclear magnetic resonance spectrometry, the presence of the two methylene groups of the imidazoline cycle and the presence of the methyl group in the 2-position on the imidazoline cycle.

The elementary ultimate analysis shows a nitrogen content of 22.1% by weight for a calculated percentage of 21.8%.

EXAMPLE 8

The procedure described in Example 1 is repeated but 1-(2-hydroxyethyl)-2-heptadecenylimidazoline is replaced by the 1-(2-hydroxyethyl)-2-methylimidazoline prepared in Example 7 and using 122.4 g (0.12 mole) of PIBSA diluted in 122.4 g of xylene and 6.1 g (0.048 mole) of the imidazoline prepared in Example 7 diluted in 6.1 g of xylene. During the first stage, refluxing is maintained for 3 hours and 0.9 ml of water is removed. After cooling to 50° C., 6.36 g (0.034 mole) of tetraethylenepentamine diluted in 5 g of xylene is added, followed by refluxing for 15 minutes. The total amount of water collected during the two stages is 1.3 ml. A solution is thus obtained of 50% by weight of active material in the xylene of a composition according to the invention.

EXAMPLE 9 (comparative)

Into a 2-liter reactor equipped with a mechanical stirring device, a Dean-Stark apparatus and a temperature regulation system is introduced 306 g (0.3 mole) of PIBSA, equivalent to 0.7 anhydride function per theoretical mole of PIBSa, diluted in 306 g of xylene, to which 39.7 g (0.21 mole) of tetraethylenepentamine diluted in 34 g of xylene is progressively (drop by drop) added, followed by refluxing for 5 hours.

The amount of water removed during the reaction is 5.7 ml. A solution is thus obtained of 50% by weight of active material in the xylene of a composition that is not in accordance with those of the present invention.

EXAMPLE 10 (comparative)

Into a 2-liter reactor equipped with a mechanical stirring device, a Dean-Stark apparatus and a temperature regulation system is introduced 586 g (0.40 moles)

of PIBSA, equivalent to 0.7 anhydride function per theoretical mole of PIBSA, diluted in 500 g of xylene. 145 g (0.41 mole) of 1-(2-hydroxyethyl)-2-heptadecenyl imidazoline diluted in 231 g of xylene is progressively (drop by drop) added at room temperature, followed by refluxing for 195 minutes. The amount of water removed during the reaction is 3.5 ml. A solution is then obtained of 50% by weight of active material in the xylene of a composition that is not in accordance with those of the present invention.

EXAMPLE 11 (comparative)

Into a 2-liter reactor equipped with a mechanical stirring device, a Dean-Stark apparatus and a temperature regulation system is introduced 1,018 g of PIBSA, equivalent to 0.7 anhydride function per theoretical mole of PIBSA, diluted in 1,018 g of xylene. A mixture of 148 g (0.423 mole) of 1-(2-hydroxyethyl)-2-heptadecenyl imidazoline and of 56 g (0.297 mole) of tetraethylenepentamine diluted in 190 g of xylene is progressively (drop by drop) added at room temperature, followed by refluxing for 195 minutes. The amount of water collected is 13.5 ml.

A solution is thus obtained of 50% by weight of active material in the xylene of a composition that is not in accordance with those of the present invention.

EXAMPLE 12

The properties of "carburetor" detergency of the compositions prepared in examples 1, 3, 4, 8, 9 and 10 are determined.

The engine testing procedure is carried out following the $R^5$—CEC—$OF_3$—T—81 European standard. The results are expressed in terms of merit, from 0 to 10. A 10 merit corresponds to a clean carburetor and a 0 merit corresponds to a very dirty carburetor. The compositions are added to the fuel in order to obtain a concentration of 300 ppm of active material in the additive-bearing fuel.

| Fuel | Merit |
|---|---|
| Fuel alone | 1.9–2.3 |
| Fuel + example 1 composition | 8.5–8.6 |
| Fuel + example 3 composition | 8.3–8.5 |
| Fuel + example 4 composition | 8.4–8.6 |
| Fuel + example 8 composition | 8.5–8.7 |
| Fuel + example 9 composition | 7.6–7.8 |
| Fuel + example 10 composition | 3.7–3.9 |

The fuel which is utilized in these determinations is a conventional supergasoline containing as an additive lead alkyls of 0.4 g of lead per liter (fuel alone).

This supergasoline contains by volume:
48.1% paraffins
15.4% olefins
29.2% aromatics
4.3% naphthenics.

EXAMPLE 13

The properties of valve detergency of the compositions prepared in examples 1, 3, 4, 8, 9, 10 and 11 are determined.

The tests have been carried out on a Renault 25 GTX through preventive-type treatments on a 5,000 km/run. At the beginning of each test, the engine is conditioned with new valves, which are weighed. At the end of the test, the valves are removed, washed with hexane, dried, and weighed after the physical elimination (by scraping) of the deposits formed on the valve on the combustion chamber side.

The amount of composition added to the supergasoline of Example 12 is 300 ppm by weight of active material.

| Fuel | Deposit Weight |
|---|---|
| Fuel alone | 360 mg |
| Fuel + example 1 composition | 19 mg |
| Fuel + example 3 composition | 18 mg |
| Fuel + example 4 composition | 20 mg |
| Fuel + example 8 composition | 17 mg |
| Fuel + example 9 composition | 160 mg |
| Fuel + example 10 composition | 108 mg |
| Fuel + example 11 composition | 177 mg |

EXAMPLE 14

To determine the anticorrosive properties of the compositions prepared in examples 1 and 8, the extent of corrosion produced on ordinary polished steel samples in the presence of synthetic sea-water possessed the following modified D 665 ASTM standard (temperature 32.2° C., duration 20 hours).

The amount of added composition is 300 ppm by weight of active material. The fuel is the same as that which was used in example 12. The results are expressed in percentage (%) of the test piece surface which has been corroded after 20 hours.

| Fuel | % of corroded surface |
|---|---|
| Fuel alone | 100% |
| Fuel + example 1 composition | 0% |
| Fuel + example 8 composition | 0% |

EXAMPLE 15

Solutions are prepared having 40% by weight of active material in the xylene of formulations F1 to F5 comprising various proportions by weight of the composition obtained in Example 1 used as said constituent (B) and, for some of them, polypropyleneglycol (constituent (A)) of formula:

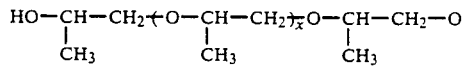

with an average molecular mass of 922 (x=13.6) and a polydispersivity of 1.1. Formulation F1 contains the constituent (B) formed by the composition obtained in Example 1 and contains no polypropylene glycol; formulation F2 comprises both constituents (A) and (B) in an A/B weight ratio of 2:3, that is, about 0.66:1; formulation F3 comprises both constituents (A) and (B) in an A/B weight ratio of 1:1; formulation F4 comprises both constituents (A) and (B) in an A/B weight ratio of 5:3, that is, about 1.66:1; and formulation F5 contains polypropyleneglycol (constituent (A)) and contains no constituent (B).

EXAMPLES 16 to 22

A series of tests are performed in order to determine the valve-detergency properties of various formulations. The tests are carried out on a M102E Mercedes engine bench, without additive in Example 16 and with the admixture of additives in the fuel in Examples 17 to 22 inclusive. The testing procedure is a conventional procedure comprising the use of a Mercedes M102E four cylinder engine, with a piston displacement of 2,299 cm$^3$ and a 9/1 compression ratio. The testing procedure is a cyclic procedure, each cycle comprising four successive running periods:

30 s (seconds) at 800 rpm (revolutions per minute) under a zero load, 60 s at 1,300 rpm under a load of 31 newtons (m×kg s$^{-2}$), 120 s at 1,850 rpm under a load of 34 newtons, and 60 s at 3,000 rpm under a load of 37 newtons.

Each test usually lasts 40 to 150 hours; in Examples 16 to 22, the test duration was 40 hours. At the beginning of each test, the engine is conditioned with new valves, which are weighed. At the end of the test, the valves are removed, washed with hexane, dried, and reweighed after the physical elimination (scraping) of the deposits formed on the valve on the combustion chamber side. The results discussed below give the average weight of the deposits in relation to a valve, calculated from the measured deposit weight on the tulip-shaped part of the inlet valve, through the difference between the weight of said new valve and the weight of said valve at the end of each test after the removal of the deposits on the combustion chamber side. The state of each valve (on the inlet side: tulip-shaped part is also visually assessed in terms of merit from 1 to 10, according to the procedure usually called CRC (Coordinating Research Council) by a person skilled in the art; the results are expressed herein in the form of an average per valve; a 10 merit corresponds to a clean valve; a 1 merit, to a very dirty valve. During removal of the valves, the sticky or non-sticky aspect of the deposits form on the inlet valves on the inlet side is also determined. The tendency to form sticky deposits might, in the long run, show a tendency toward a future valve sticking phenomenon which it should be advisable to be able to avoid. The fuel which is used for these assessments is an unleaded supergasoline comprising 2% by volume of a mixture of methanol and of tertiobutanol of a volume ratio of 1.5:1. This supergasoline, having a motor octane number of 85 and a research octane number of 95, has an initial boiling point of 32° C. and a final boiling point of 227° C.; it comprises by volume:

49% of aromatics
11% of olefins
40% of saturated compounds (paraffins+naphthenics).

The formulations are added to the fuel in order to obtain a concentration, by weight of active material in the additive-bearing fuel, which is given for each example in Table II, including the obtained results.

TABLE II

| Example | Additive amount | Deposits average in mg | CRC average | Deposits aspect |
|---|---|---|---|---|
| 16* | 0 ppm | 239 | 7.7 | |
| 17* | F1: 300 ppm | 113 | 8.9 | sticky |
| 18 | F2: 500 ppm 200 ppm of A 300 ppm of B | 30 | 9.7 | slightly sticky |
| 19 | F3: 600 ppm 300 ppm of A 300 ppm of B | 7 | 9.8 | not sticky |
| 20 | F4: 800 ppm 500 ppm of A 300 ppm of B | 50 | 8.7 | slightly sticky |
| 21* | F1: 600 ppm | 120 | 8.6 | sticky |

TABLE II-continued

| Example | Additive amount | Deposits average in mg | CRC average | Deposits aspect |
|---|---|---|---|---|
| 22* | F5: 600 ppm | 203 | 7.8 | |

*comparison

EXAMPLES 23 to 27

A series of test have been carried out in order to determine the valve-detergency properties of various formulations. The tests have been performed following the procedure described for Examples 16 to 22. In these examples, the duration of the tests is 60 hours and the fuel which is utilized is an unleaded fuel comprising by volume:

26% of aromatics
6.3% of olefins
67/7% of saturated compounds (paraffins+naphthenics).

The formulations are added to the fuel in order to obtain a concentration, by weight of active material in the additive-baring fuel, indicated for each example in Table III, including the obtained results:

TABLE III

| Example | Additive amount | Deposits average in mg | CRC average |
|---|---|---|---|
| 23* | 0 ppm | 172 | 8.8 |
| 24* | F1: 300 ppm | 80 | 9.5 |
| 25 | F3: 600 ppm 300 ppm of A 300 ppm of B | 10 | 9.7 |
| 26* | F1: 600 ppm | 87 | 9.4 |
| 27* | F5: 600 ppm | 165 | 8.8 |

*comparison

The analysis of the results obtained in the previous examples shows that the formulations according to the present invention allow high reduction of the amounts of deposits formed on the inlet valves and also changing the character of these deposits in comparison to that which they show in the presence of an additive, such as the aspect of the deposits described in examples 1 to 8. The possibility of obtaining deposits with a non-stick character allows the supposition that the sticking phenomenon of the valves will not appear.

We claim:

1. A multifunction additive for engine fuels, resulting in a first stage, from the reaction of at least one succinic derivative selected from the group consisting of alkenylsuccinic acids and anhydrides, and polyalkenylsuccinic acids and anhydrides, with at least one 1-(2-hydroxyethyl-) imidazoline substituted in the 2-position by a linear or branched alkyl or alkenyl radical with 1 to 25 carbon atoms, the imidazoline to succinic derivative molar ration ranging from 0.1:1 to 0.9:1, said stage being carried out under conditions such that at least 0.15 mole of water per mole of utilized imidazoline are formed and removed; and in a second stage of the reaction of the product obtained at the end of the first stage with at least one polyamine corresponding to one of the following formulae:

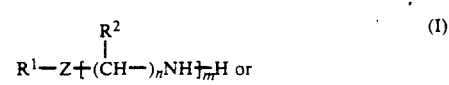

(I)

-continued

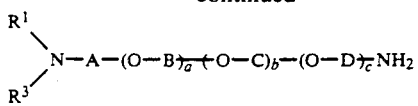  (II)

wherein $R^1$ represents an atom of hydrogen or a hydrocarbon group with 1 to 60 carbon atoms, Z is an —O— and —$NR^3$— group in which $R^3$ represents an atom of hydrogen or a hydrocarbon group with 1 to 60 carbon atoms, $R^1$ and $R^3$ can form together with the nitrogen atoms to which they are linked a heterocycle, each $R^2$ independently representing an atom of hydrogen or a hydrocarbon group with 1 to 4 carbon atoms, n is an integral number from 2 to 6, m is an integral number from 1 to 10 when Z is —$NR^3$— and an integral number from 2 to 10 when Z is —O—, A, B, C and D each independently are a divalent hydrocarbon group with 2 to 6 carbon atoms, a is an integral number from 1 to 120, b and c are each independently zero or an integral number from 1 to 100 and the sum a+b+c is an integral number from 1 to 120, the amount of polyamine reacted being at least 0.1 mole per mole of succinic derivative employed during the first stage.

2. An additive according to claim 1 wherein the succinic derivative is an alkenylsuccinic or polyalkenylsuccinic anhydride with an average molecular mass ranging from 200 to 3,000.

3. An additive according to claim 1, wherein the polyamine has formula (I):

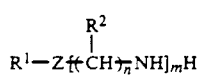

where $R^1$ is an atom of hydrogen or a hydrocarbon group with 1 to 30 carbon atoms, Z is a —$NR^3$— group in which $R^3$ represents a hydrogen atom or a hydrocarbon group with 1 to 30 carbon atoms, each $R^2$ independently represents a hydrogen atom or a methyl group, n is an integral number from 2 to 4 and m is an integral number from 1 to 5.

4. An additive according to claim 1, wherein the polyamine has formula (I):

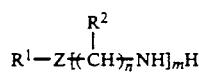

where $R^1$ and $R^2$ each represent a hydrogen atom, Z represents an —$NR^3$— group in which $R^3$ represents a hydrogen atoms, n is equal to 2 and m is an integral number from 1 to 5.

5. An additive according to claim 1, wherein the polyamine corresponds to the general formula (I):

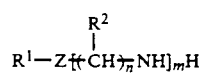

where $R^1$ represents a hydrocarbon group with 5 to 24 carbon atoms, Z represents a —$NR^3$— group in which $R^3$ is a hydrogen atom, $R^2$ represents a hydrogen atom, n is equal to 3 and m is equal to 1.

6. An additive according to claim 1, wherein the polyamine has formula (II):

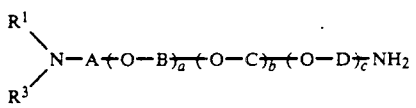

where $R^1$ and $R^2$ each represent hydrogen, A, B, C and D are each independently a divalent hydrocarbon group with 2 to 4 carbon atoms, a is an integral number from 1 to 60 and b and c are equal to zero or a is an integral number from 1 to 59, c is zero or an integral number so that the sum of a+b+c ranges from 1 to 59 and b is an integral number from 1 to 50, the sum of a+b+c being in all cases an integral number from 1 to 60.

7. An additive according to claim 1, wherein the reactions are carried out at a temperature ranging from 65° to 250° C.

8. An additive according to claim 1, wherein the reactions are carried out at a temperature ranging from 65° to 250°.

9. An additive according to claim 1 wherein the reactions are carried out i the presence of a solvent with a boiling point ranging from about 65° to 260° C., allowing the azeotropic removal of the water, said reactions being carried out at the reflux temperature.

10. A fuel composition comprising (a) a hydrocarbon or a mixture of hydrocarbons and at least one oxygen compound selected from the group consisting of alcohols and ethers, and (b) a detergent effective amount of an additive according to claim 1.

11. An additive composition for fuel, comprising a detergent effective amounts of at least one constituent (A) and at least one constituent (B), said constituent (A) comprising at least one polyglycol, soluble in said fuel, with an average molecular mass ranging from 480 to 2,100 and of the general formula (I):

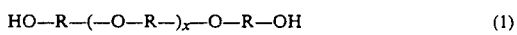  (1)

where each R group independently represents a hydrocarbon group with 2 to 6 atoms of carbon and x represents the average degree of polymerization; and said constituent (B) comprising at least one composition according to claim 1.

12. An additive composition according to claim 11, wherein constituent (A) is a polyglycol of formula (I) in which each R group independently represents a linear or branched alkylene group with 2 or 4 atoms of carbon.

13. An additive composition according to claim 11, wherein constituent (A) is a polyglycol of the general formula (I) in which each R group independently represents an ethylene or propylene group.

14. An additive composition according to claim 11 wherein constituent (A) is a polyglycol of the general formula (I) in which each R group represents a propylene group.

15. An additive composition according to claim 11 wherein constituent (A) is a polyglycol of the general formula (I) with a polydispersivity number ranging from about 1 to about 1.25.

16. A fuel composition comprising (a) a hydrocarbon or a mixture of hydrocarbons and at least one oxygen compound selected from the group consisting of alcohols and ethers, and (b) a detergent effective amount of an additive according to claim 11.

17. In a method of operating an internal combustion engine, comprising feeding a fuel under combustion conditions, the improvement wherein the fuel is a composition according to claim 16.

18. A method according to claim 17, comprising adding 20 to 3,000 ppm by weight of the additive composition.

19. A method according to claim 18, wherein the additive composition comprises 10 to 2,000 ppm by weight of constituent (A) and 10 to 1,000 ppm by weight of constituent (B).

20. A method according to claim 19, wherein the amount of each constituent (A) and (BA) is such that the A/B ratio is about 0.05:1 to about 20:1.

21. In a method of operating an internal combustion engine, comprising feeding a fuel under combustion conditions, the improvement wherein the fuel is a composition according to claim 10.

22. A method according to claim 21, comprising adding 10 to 10,000 ppm by weight of the additive composition to the fuel.

* * * * *